(12) United States Patent
Mizumoto et al.

(10) Patent No.: US 6,866,927 B2
(45) Date of Patent: Mar. 15, 2005

(54) FILTER FOR IMAGE DISPLAY DEVICE

(75) Inventors: Tomohiro Mizumoto, Niihama (JP); Masakazu Sumida, Niihama (JP); Kiyoshi Muto, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 308 days.

(21) Appl. No.: 10/136,316

(22) Filed: May 2, 2002

(65) Prior Publication Data

US 2003/0008132 A1 Jan. 9, 2003

(30) Foreign Application Priority Data

May 14, 2001 (JP) ........................................ 2001-142973
Dec. 27, 2001 (JP) ........................................ 2001-396287

(51) Int. Cl.[7] .............................................. B32B 27/00
(52) U.S. Cl. ..................... 428/332; 428/339; 428/411.1
(58) Field of Search ................................ 428/339, 332, 428/411.1

(56) References Cited

U.S. PATENT DOCUMENTS 6,638,624 B2 * 10/2003 Ozawa .................... 428/411.1

FOREIGN PATENT DOCUMENTS

| JP | 2001-13317 A | 1/2001 |
| WO | WO 98/23980 A1 | 6/1998 |
| WO | WO 00/53552 A1 | 9/2000 |

\* cited by examiner

*Primary Examiner*—Monique R. Jackson
(74) *Attorney, Agent, or Firm*—Sughrue Mion, PLLC

(57) ABSTRACT

The present invention provides a filter for an image display device comprising a resin layer having a thickness of about 1 mm or less containing therein (A) at least one compound selected from a compound of the following formula (1) and the following formula (2):

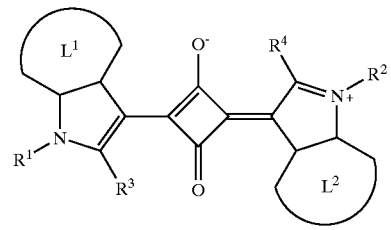

(1)

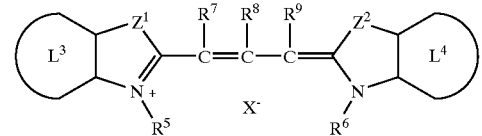

(2)

wherein $R^1$ to $R^9$, $Z^1$ and $Z^2$ each independently represent an appropriate substituent, $L^1$ to $L^4$ each independently represent an aromatic ring optionally having a substituent, and $X^-$ represents a counter anion; and (B) a compound having an absorption peak of light in the wavelength range from about 780 nm to about 1200 nm. This filter for an image display device is excellent in contrast and color reproducibility of an image and also in durability, and is suitably used for a plasma display panel.

9 Claims, No Drawings

FILTER FOR IMAGE DISPLAY DEVICE

BACKGROUND OF THE INVENTION

1. Technical Field of the Invention

The present invention relates to a filter used for image display devices such as a plasma display panel.

2. Description of the Related Art

In image display devices such as a plasma display panel, color images are usually displayed by emitting lights of three primary colors of red(R), green (G) and blue (B) in combination, however, there exists a problem of deterioration in contrast and color reproducibility of an image by deterioration of color purity due to the presence of unnecessary lights other than three primary colors. For example, in a plasma display panel using neon-xenon as a rare gas, it is known that visual light emission of so-called neon-orange is a cause of deterioration in color purity (Television Institute Journal, vol. 48, no. 9, pp. 1098–1101, 1994).

As one method for solving such problems, there are various methods suggested absorbing unnecessary lights using a light selective absorption filter, and for example, JP-A-Nos. 2000-43175, 2000-284116 and 2001-13317 suggest an optical filter having a layer containing various dyes as a filter for an image display device such as a plasma display panel.

However, when these conventionally filters are used, unnecessary lights, particularly, lights having wavelengths near 580 nm show insufficient selective absorption and emits fluorescent light, accordingly, contrast and color reproducibility of an image are not satisfactory. Further, since absorption of an unnecessary light lowers and color tone thereof changes by use for a long time, durability is not satisfactory.

SUMMARY OF THE INVENTION

Therefore, an object of the present invention is to solve the above-mentioned problems and provide a filter for an image display device excellent in contrast and color reproducibility of an image and also in durability.

The present inventors have intensively studied, and resultantly found that a filter for an image display device satisfying the above-mentioned object is obtained by allowing two kinds of light absorbing compounds as described herein to be contained in a resin layer having a thickness of 1 mm or less, leading to completion of the invention.

Namely, the present invention relates to a filter for an image display device comprising a resin layer having a thickness of 1 mm or less containing therein (A) at least one compound selected from a compound of the following formula (1):

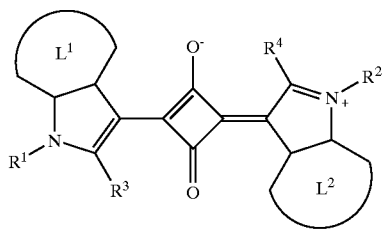

(1)

wherein $R^1$ and $R^2$ each independently represent an aliphatic hydrocarbon group optionally having a substituent, $R^3$ and $R^4$ each independently represent a hydrogen atom or substituent, and $L^1$ and $L^2$ each independently represent an aromatic ring optionally having a substituent; and the following formula (2):

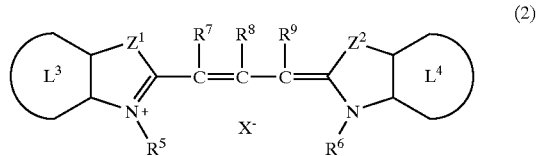

(2)

wherein $R^5$ and $R^6$ each independently represent an aliphatic hydrocarbon group optionally having a substituent, $R^7$ to $R^9$ each independently represent a hydrogen atom or substituent, $Z^1$ and $Z^2$ each independently represent a group for forming a 5-membered ring, $L^3$ and $L^4$ each independently represent an aromatic ring optionally having a substituent, and $X^-$ represents a counter anion; and (B) a compound having an absorption peak of light in the wavelength range from about 780 nm to about 1200 nm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

In the filter of the present invention, a compound of the above-mentioned formula (1) or the above-mentioned formula (2) (hereinafter, referred to as "component A", sometimes) or both are contained in a resin layer. As component A, those having an absorption peak of light in the wavelength range from about 550 nm to about 610 nm are preferable, and of them, those having the maximum peak in absorption peaks of light in the wavelength range from about 380 nm to about 780 nm, in the wavelength range from about 550 nm to about 610 nm are further preferable.

In the formula (1), examples of the aliphatic hydrocarbon groups represented by $R^1$ and $R^2$ include a methyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, 2-pentynyl group, 2-penten-4-ynyl, hexyl group, isohexyl group, 5-methylhexyl group, octyl group, nonyl group, decyl group, undecyl group, dodecyl group, octadecyl group and the like. The above-mentioned aliphatic hydrocarbon group may have at least one substituent, and examples of the substituent include alycyclic hydrocarbon groups such as a cyclopropyl group, cyclobutyl group, cyclopentyl group, cyclohexyl group, 1-cyclohexenyl group and cycloheptyl group; aromatic hydrocarbon groups such as a phenyl group, o-tolyl group, m-tolyl group, p-tolyl group, xylyl group, mesityl group, o-cumenyl group, m-cumenyl group, p-cumenyl group and biphenylyl group; ether groups such as a methoxyl group, ethoxy group, propoxy group, butoxy group, pentyloxy group, benzyloxy group and phenoxy group; ester groups such as a methoxycarbonyl group, ethoxycarbonyl group, propoxycarbonyl group, acetoxy group and benzoyloxy group; halogen atoms such as a fluoro atom, chloro atom, bromo atom and iodo atom; and the like.

Of them, $R^1$ and $R^2$ each independently represent preferably an alkyl group having 1 to 20 carbon atoms or an aralkyl group having 7 to 20 carbon atoms, further preferably a methyl group, butyl group, 2-ethylhexyl group, octyl group, octadecyl group or benzyl group.

The number of carbon atoms of $R^1$ and $R^2$ are preferably 2 or more, further preferably 4 or more from the standpoint of handling properties such as solubility in an organic solvent, and the like, and preferably 18 or less from the standpoint of easiness for crystallization and purification.

In the formula (1), examples of the substituent represented by $R^3$ and $R^4$ include aliphatic hydrocarbon groups such as a methyl group, ethyl group, propyl group, isopropyl group, butyl group, isobutyl group, sec-butyl group, tert-butyl group, pentyl group, isopentyl group, neopentyl group, tert-pentyl group, hexyl and isohexyl group; alicyclic hydrocarbon groups such as a cyclopropyl group, cyclobutyl group, cyclopentyl group and cyclohexyl group; aromatic hydrocarbon groups such as a phenyl group, o-tolyl group, m-tolyl group, p-tolyl group, xylyl group, mesityl group, o-cumenyl group, m-cumenyl group, p-cumenyl group and biphenylyl group; ether groups such as a methoxyl group, ethoxy group, propoxy group, butoxy group, pentyloxy group, benzyloxy group and phenoxy group; ester groups such as a methoxycarbonyl group, ethoxycarbonyl group, propoxycarbonyl group, acetoxy group and benzoyloxy group; halogen groups such as a fluoro group, chloro group, bromo group and iodo group; carboxyl group, hydroxy group, cyano group, nitro group and the like.

Of them, $R^3$ and $R^4$ each independently represent preferably a hydrogen atom, an alkyl group having 1 to 20 carbon atoms or an aralkyl group having 7 to 20 carbon atoms, further preferably a hydrogen atom or a methyl group.

In the formula (1), examples of the aromatic ring represented by $L^1$ and $L^2$ include monocyclic rings such as a benzene ring, naphthalene ring, phenanthrene ring, pyrene ring and fluorene ring, and heterocyclic rings such as a pyridine ring, pyrazine ring, quinoline ring, quinoxaline ring, carbazole ring and dibenzofuran ring. This aromatic ring may have at least one substituent, and examples of the substituent include aliphatic hydrocarbon groups such as a methyl group, ethyl group, propyl group, butyl group, tert-butyl group and pentyl group; alicyclic hydrocarbon groups such as a cyclopropyl group, cyclobutyl group, cyclopentyl group and cyclohexyl group; aromatic hydrocarbon groups such as a phenyl group, o-tolyl group, m-tolyl group, p-tolyl group, xylyl group, mesityl group, o-cumenyl group, m-cumenyl group, p-cumenyl group and biphenylyl group; ether groups such as a methoxyl group, ethoxy group, propoxy group, butoxy group, tert-butoxy group, pentyloxy group, benzyloxy group and phenoxy group; ester groups such as a methoxycarbonyl group, ethoxycarbonyl group, propoxycarbonyl group, acetoxy group and benzoyloxy group; halogen atoms such as a fluoro atom, chloro atom, bromo atom and iodo atom; hydroxy group, carboxyl group, cyano group, nitro group and the like.

Of them, $L^1$ and $L^2$ each independently represent preferably a benzene ring optionally having a substituent. The substituent is preferably an alkyl group having 1 to 20 carbon atoms, an aryl group having 6 to 20 carbon atoms, an aralkyl group having 7 to 20 carbon atoms or a halogen atom, further preferably a methyl group, ethyl group or phenyl group.

Examples of the compound of the formula (1) include the following compounds.

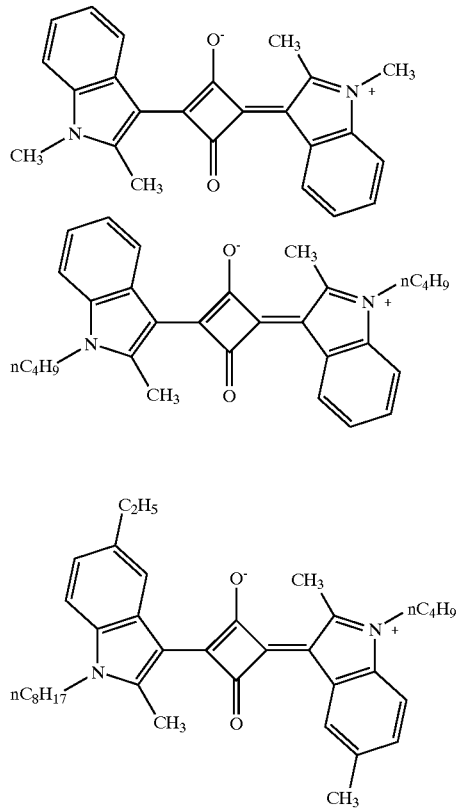

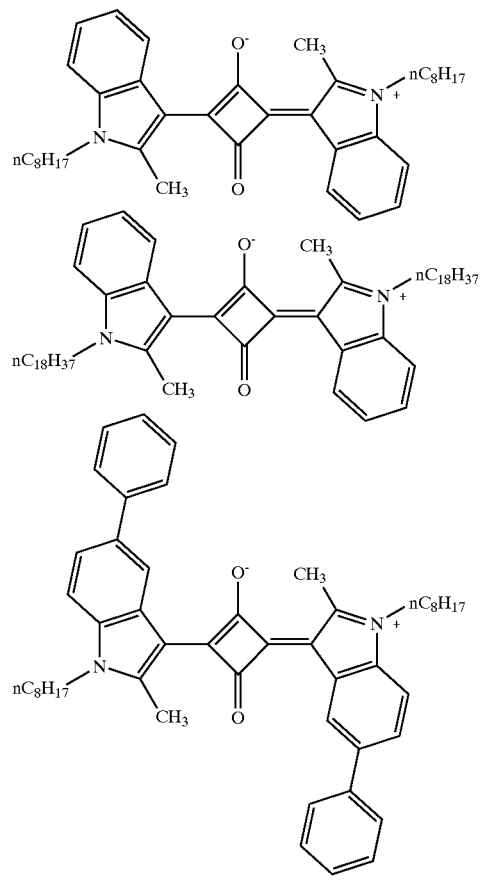

-continued

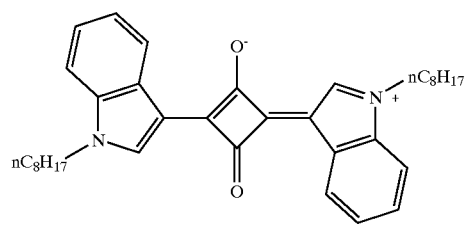
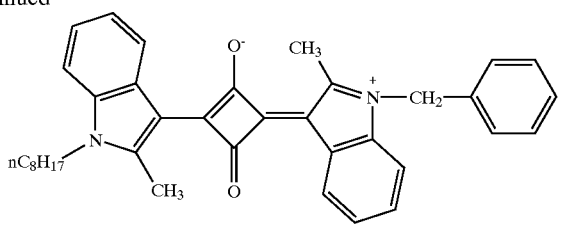
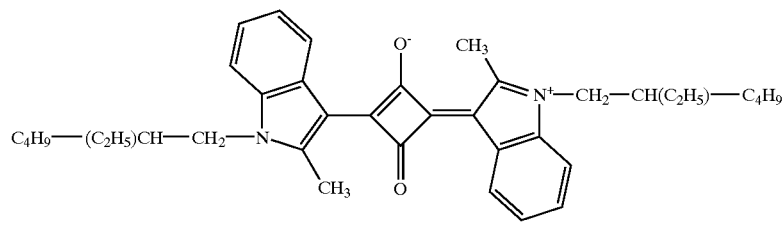
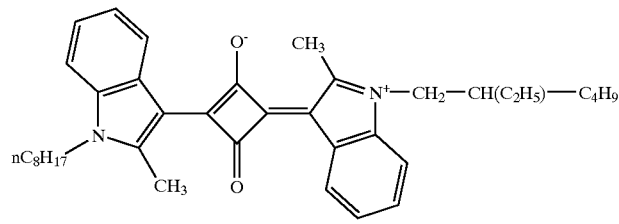

The compound of the formula (1) can be prepared, for example, by reacting 3,4-dihydroxy-3-cyclobutene-1,2-dione (also called square acid), a compound of the following formula (3):

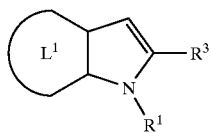  (3)

wherein $R^1$, $R^3$ and $L^1$ represent the same described above; and a compound of the following formula (4):

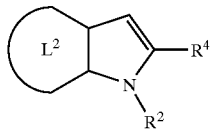  (4)

wherein $R^2$, $R^4$ and $L^2$ represent the same described above; in an organic solvent.

In the formula (2), examples of the aliphatic hydrocarbon groups represented by $R^5$ and $R^6$ include a methyl group, ethyl group, propyl group, isopropyl group, butyl group, isobutyl group, sec-butyl group, tert-butyl group, pentyl group, isopentyl group, neopentyl group, tert-pentyl group, 1-methylpentyl group, 2-methylpentyl group, 2-pentynyl group, 2-penten-4-ynyl, hexyl group, isohexyl group, 5-methylhexyl group, octyl group, nonyl group, decyl group, undecyl group, dodecyl group, octadecyl group and the like. The above-mentioned aliphatic hydrocarbon group may have at least one substituent, and examples of the substituent include alycyclic hydrocarbon groups such as a cyclopropyl group, cyclobutyl group, cyclopentyl group, cyclohexyl group, 1-cyclohexenyl group and cycloheptyl group; aromatic hydrocarbon groups such as a phenyl group, o-tolyl group, m-tolyl group, p-tolyl group, xylyl group, mesityl group, o-cumenyl group, m-cumenyl group, p-cumenyl group and biphenylyl group; ether groups such as a methoxyl group, ethoxy group, propoxy group, butoxy group, pentyloxy group, benzyloxy group and phenoxy group; ester groups such as a methoxycarbonyl group, ethoxycarbonyl group, propoxycarbonyl group, acetoxy group and benzoyloxy group; halogen groups such as a fluoro group, chloro group, bromo group and iodo group; acidic groups such as a carboxyl group and sulfo group; hydroxyl group, cyano group and nitro group, and the like.

Of them, $R^5$ and $R^6$ each independently represent preferably an alkyl group having 1 to 20 carbon atoms or an aralkyl group having 7 to 20 carbon atoms, further preferably a methyl group, ethyl group, butyl group, hexyl group or octadecyl group.

In the formula (2), examples of the substituent represented by $R^7$ to $R^9$ include aliphatic hydrocarbon groups such as a methyl group, ethyl group, propyl group, isopropyl group, butyl group, isobutyl group, sec-butyl group, tert-butyl group, pentyl group, isopentyl group, neopentyl group, tert-pentyl group, hexyl and isohexyl group; alicyclic hydrocarbon groups such as a cyclopropyl group, cyclobutyl group, cyclopentyl group and cyclohexyl group; aromatic hydrocarbon groups such as a phenyl group, o-tolyl group, m-tolyl group, p-tolyl group, xylyl group, mesityl group, o-cumenyl group, m-cumenyl group, p-cumenyl group and biphenylyl group; ether groups such as a methoxyl group, ethoxy group, propoxy group, butoxy group, pentyloxy group, benzyloxy group and phenoxy group; ester groups such as a methoxycarbonyl group, ethoxycarbonyl group, propoxycarbonyl group, acetoxy group and benzoyloxy group; halogen groups such as a fluoro group, chloro group, bromo group and iodo group; acidic groups such as a carboxyl group and sulfo group; hydroxy group, cyano group, nitro group and the like. The above-mentioned aliphatic hydrocarbon group, alicyclic hydrocarbon group and aromatic hydrocarbon group may each have at least one substituent, and examples of the substituent include ether groups such as a methoxyl group, ethoxy group, propoxy group, butoxy group, pentyloxy group, benzyloxy group and phenoxy group; ester groups such as a methoxycarbonyl group, ethoxycarbonyl group, propoxycarbonyl group, acetoxy group and benzoyloxy group; halogen groups such as a fluoro group, chloro group, bromo group and iodo group; acidic groups such as a carboxyl group and sulfo group; hydroxyl group, cyano group and nitro group, and the like. Further, at least two of $R^7$ to $R^9$ may form a ring such as a 5-membered ring or 6-membered ring, together with carbon atoms to which they are bonded.

Of them, $R^7$ to $R^9$ each independently represent preferably a hydrogen atom, an alkyl group having 1 to 20 carbon atoms or an aralkyl group having 7 to 20 carbon atoms, further preferably a hydrogen atom, methyl group or iso-propyl group.

In the formula (2), as the groups $Z^1$ and $Z^2$ for forming a 5-membered ring, for example, a methylene group, imino group, oxygen atom, sulfur atom, selenium atom, tellurium atom and the like are listed. The methylene group may have one or two substituents, and the imino group may have one substituent, respectively. Examples of the substituent include aliphatic hydrocarbon groups such as a methyl group, ethyl group, propyl group and isopropyl group; alicyclic hydrocarbons such as a cyclopentyl group and cyclohexyl group; aromatic hydrocarbon groups such as a phenyl group, o-tolyl group, p-cumenyl group and biphenylyl group. The above-mentioned aliphatic hydrocarbon group, alicyclic hydrocarbon group and aromatic hydrocarbon group may each have at least one substituent, and examples of the substituent include ether groups such as a methoxyl group, ethoxy group, propoxy group, butoxy group, pentyloxy group, benzyloxy group and phenoxy group; ester groups such as a methoxycarbonyl group, ethoxycarbonyl group, propoxycarbonyl group, acetoxy group and benzoyloxy group; halogen groups such as a fluoro group, chloro group, bromo group and iodo group; acidic groups such as a carboxyl group and sulfo group; hydroxyl group, cyano group and nitro group, and the like.

Of them, $Z^1$ and $Z^2$ each independently represent preferably an alkylidene group having 1 to 20 carbon atoms, alkylimino group having 1 to 20 carbon atoms, oxygen atom, sulfur atom, selenium atom or tellurium atom, further preferably an isopropylidene group, methylimino group, butylimino group, oxygen atom, sulfur atom or selenium atom.

In the formula (2), examples of the aromatic ring represented by $L^3$ and $L^4$ include monocyclic rings such as a benzene ring, naphthalene ring, phenanthrene ring, pyrene ring and fluorene ring, and heterocyclic rings such as a pyridine ring, pyrazine ring, quinoline ring, quinoxaline ring, carbazole ring and dibenzofuran ring. This aromatic ring may have at least one substituent, and examples of the substituent include aliphatic hydrocarbon groups such as a methyl group, ethyl group and propyl group; alicyclic hydrocarbon groups such as a cyclopropyl group, cyclobutyl group, cyclopentyl group and cyclohexyl group; aromatic hydrocarbon groups such as a phenyl group, o-tolyl group, m-tolyl group, p-cumenyl group and biphenylyl group; ether groups such as a methoxyl group, butoxy group, t-butoxy group, benzyloxy group and phenoxy group; ester groups such as a methoxycarbonyl group, ethoxycarbonyl group, acetoxy group and benzoyloxy group; halogen groups such as a fluoro group, chloro group, bromo group and iodo group; residues of organic acids such as a carboxyl group and sulfo group; hydroxy group, carboxyl group, cyano group, nitro group and the like. The above-mentioned aliphatic hydrocarbon group, alicyclic hydrocarbon group and aromatic hydrocarbon group may each have at least one substituent, and examples of the substituent include ether groups such as a methoxyl group, ethoxy group, propoxy group, butoxy group, pentyloxy group, benzyloxy group and phenoxy group; ester groups such as a methoxycarbonyl group, ethoxycarbonyl group, propoxycarbonyl group, acetoxy group and benzoyloxy group; halogen groups such as a fluoro group, chloro group, bromo group and iodo group; acidic groups such as a carboxyl group and sulfo group; hydroxyl group, cyano group and nitro group, and the like.

Of them, $L^3$ and $L^4$ each independently represent preferably a benzene ring or naphthalene ring optionally having a substituent. The substituent is preferably an alkyl group having 1 to 20 carbon atoms, an aryl group having 6 to 20 carbon atoms, an aralkyl group having 7 to 20 carbon atoms or a halogen atom, further preferably a phenyl group or bromo atom.

In the formula (2), examples of the counter anion of $X^-$ include halide ions such as a chloride ion, bromide ion and iodide ion; perhalogenate ions such as a perchlorate ion, perbromate ion and periodate ion; alkyl sulfate ions such as a methyl sulfate ion and ethyl sulfate ion; fluoro complex ions such as a boron tetrafluoride ion, antimony hexafluoride ion and phosphorus hexafluoride ion; sulfonate ions such as a p-toluenesulfonate ion and p-chlorobenzenesulfonate ion; and the like. When the above-mentioned $R^5$ to $R^9$, $Z^1$, $Z^2$, $L^4$ or $L^5$ has an acidic group such as a carboxyl group and sulfo group, this acidic group may be dissociated to become an anion group forming an intramolecular salt, and in this case, this anion group corresponds to $X^-$.

Of them, $X^-$ represents preferably a halide ion, perhalogenate ion, fluoro complex ion or sulfonate ion, further preferably a chloride ion, bromide ion, iodide ion, perchlorate ion, boron tetrafluoride ion, antimony hexafluoride ion, phosphorus hexafluoride ion or p-toluenesulfonate ion.

Specific examples of the compound of the formula (2) include the following compounds.

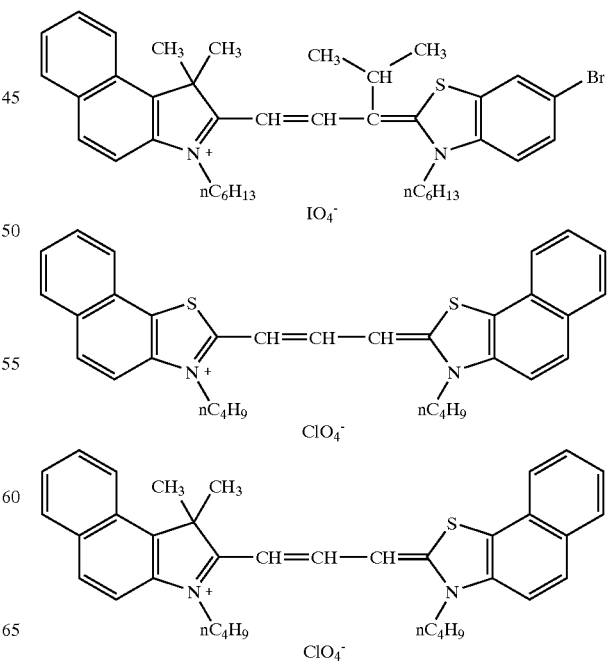

-continued

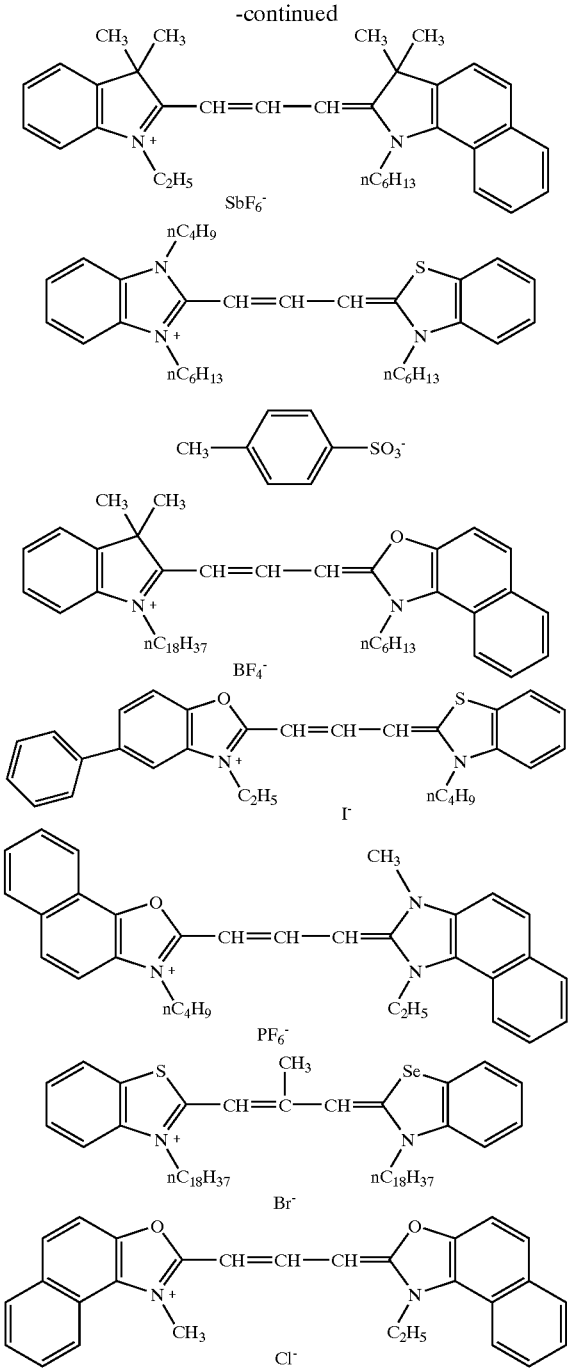

The compound of the formula (2) can be prepared, for example, by (i) a method comprising the step of reacting a compound of the following formula (5):

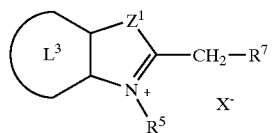

wherein $R^5$, $R^7$, $Z^1$, $L^3$ and $X^-$ represent the same described above; a compound of the following formula (6):

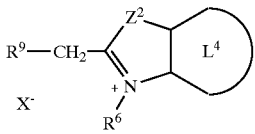

wherein $R^6$, $R^9$, $Z^2$, $L^4$ and $X^-$ represent the same described above; and esters of an orthocarboxylic acid $R^8$—$C(OH)_3$, or (ii) a method comprising the step of reacting a compound of the following formula (7):

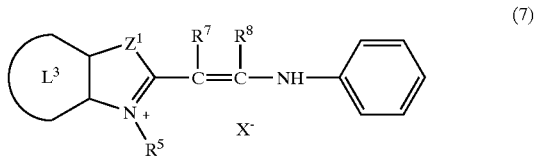

wherein $R^5$, $R^7$, $R^8$, $Z^1$, $L^3$ and $X^-$ represent the same described above; and a compound of the above-mentioned formula (6), in the presence of triethylamine and acetic anhydride, in an organic solvent ("Photosensitive Dye—It's Strange Action and Various Function—" pp.25–28, edited by Nippon Kankoshikiso Kenkyusho Co., Ltd., published by Sangyou Tosho Co., Ltd.).

The component A may be used in combination of two or more if necessary, and in this case, two or more compounds of the formula (1) may be used, two or more compounds of the formula (2) may be used, or one or more compounds of the formula (1) and one or more compounds of the formula (2) may be used respectively.

In the filter of the present invention, a resin layer contains, in addition to the above-mentioned component A, further (B) a compound having an absorption peak of light in the wavelength range from about 780 nm to about 1200 nm (hereinafter, referred to as "component B", sometimes). By thus allowing the component A and the component B to co-exist in a resin layer, fluorescent light emitting from the component A, particularly, fluorescent light around 600 nm can be suppressed, and contrast and color reproducibility of an image can be enhanced. In addition, decrease in light absorbing property and discoloration of the component A due to heat and humidity can be suppressed, and the durability of a filter can be enhanced. Further, by allowing the component B to be contained in a resin layer, near infrared ray-shielding ability can be imparted, and even if a layer having this ability is not provided separately, malfunctioning of peripheral devices such as a remote control device and the like can be prevented.

As the component B, for example, phthalocyanine compound, dioxazine compound, benzofuran compound, thiophenemonoazo compound, anthraquinone compound, cyanine compound, diimmonium compound, aminium compound and the like are listed, and if necessary, two or more of them can be used. Of them, phthalocyanine compound, particularly, fluorine-containing phthalocyanine compound and diimmonium compound are preferable from the standpoint of near infrared ray-absorbing property and durability. As the component B, components having the maximum peak in absorption peaks of light in the wavelength range from about 380 nm to about 1200 nm, in the wavelength range from about 780 nm to about 1200 nm are preferable, and of them, components having the maximum peak in absorption peaks of light in the wavelength range from about 380 nm to about 1100 nm, in the wavelength range from about 780 nm to about 1050 nm are more preferable.

When two or more components B are used, it is preferable to use a compound having an absorption peak of light in the wavelength range from about 780 nm to about 1000 nm and a compound having an absorption peak of light in the wavelength range from about 1000 nm to about 1200 nm, together. By this, near infrared ray-shielding ability in a wide wavelength range can be imparted.

As the example of the component B having an absorption peak of light in the wavelength range from about 780 nm to about 1000 nm, phthalocyanine compounds, dioxazine compounds, benzofuran compounds, thiophenemonoazo compounds, anthraquinone compounds, cyanine compound and the like are listed, and if necessary, two or more of them can be used. Of them, phthalocyanine compounds, particularly, fluorine-containing phthalocyanine compounds are preferable from the standpoint of near infrared ray-absorbing property and durability. Further, components having the maximum peak in absorption peaks of light in the wavelength range from about 380 nm to about 1200 nm, in the wavelength range from about 780 nm to about 1000 nm are preferable.

As the example of the component B having an absorption peak of light in the wavelength range from about 1000 nm to about 1200 nm, diiummonium compound, phthalocyanine compound and aminium compound are listed, and if necessary, two or more of them can be used. Of them, diimmonium compounds are preferable from the standpoint of near infrared ray-absorbing property and durability. Further, components having the maximum peak in absorption peaks of light in the wavelength range from about 380 nm to about 1200 nm, in the wavelength range from about 1000 nm to about 1200 nm are preferable.

Given as examples of commercially available products of the phthalocyanine compound are EXcolor® IR-1, IR-2, 802K, IR-10, IR-12 and the like manufactured by Nippon Shokubai Co., Ltd. Further, given as examples of commercially available products of the diimmonium compound are IRG-022, IRG-040 manufactured by Nippon Kayaku Co., Ltd. and CIR-1081 and the like manufactured by Japan Carlit Co., Ltd.

The thickness of a resin layer containing the above-mentioned component A and component B is about 1 mm or less, preferably about 0.5 mm or less, further preferably about 0.2 mm or less. When the thickness of the resin layer is over about 1 mm, an effect of suppressing fluorescent light emitting from the component A is not sufficient. The lower limit of the thickness of the resin layer is usually about 0.0001 mm, preferably about 0.0002 mm from the standpoint of easiness in making the thickness uniform.

As the resin constituting a resin layer, for example, acrylic resin, polycarbonate resin, triacetylcellulose resin, polystyrene resin, polyester resin, ABS resin, polyvinyl alcohol resin, polyvinyl acetate resin, polyolefin resin and the like, and if necessary, two or more of them can be used.

The content of the component A and component B in a resin layer is appropriately selected depending on use of a filter, and the like, and in the case of a filter for a plasma display panel, for example, the content is so controlled that the light transmittance at a wavelength of 585 nm is usually about 60% or less, preferably about 40% or less, and that the light transmittance in a wavelength range from 780 nm to 1200 nm is usually about 20% or less, preferably, the light transmittance in a wavelength range from 850 nm to 1100 nm is about 10% or less. The content of the component A in a resin layer is usually from about 0.01 to about 10 parts by weight based on 100 parts by weight of the resin, and the content of the component B in a resin layer is usually from about 0.05 to about 60 parts by weight based in 100 parts by weight of the resin.

The filter of the present invention is constituted of the above-mentioned resin layer, and may be a mono-layer body composed substantially only of the above-mentioned resin layer, or a multi-layer body in which the above-mentioned resin layer is laminated on a transparent substrate.

The mono-layer body filter may be, for example, that obtained by melt-kneading the component A, component B and the resin and subjecting the mixture to extrusion molding or cast molding, or that obtained by solvent cast molding using a solution containing the component A, component B and the resin.

The multi-layer body filter may be, for example, that obtained by effecting coating or printing on a transparent substrate using the component A, component B and the resin, or that obtained by pasting a film and the like on a transparent substrate using an adhesive composed of the component A, component B and the resin.

As the transparent substrate, for example, acrylic resin, polycarbonate resin, triacetylcellulose resin, polystyrene resin, polyester resin, ABS resin, glass and the like are listed. The thickness of the transparent substrate is appropriately selected depending on the use embodiment of a filter, and usually from about 0.01 mm to about 30 mm.

As the method of coating a solution containing the component A, component B and the resin on a substrate, for example, methods such as dip coating, bar coating, gravure coating, micro gravure coating, die coating, comma coating and the like are mentioned. As the method of printing a solution containing the component A, component B and the resin on a substrate, for example, screen printing, gravure printing, offset printing, flexo printing and the like are mentioned.

The filter of the present invention shows a difference between the light reflectance at a wavelength of 620 nm and the light reflectance at a wavelength of 550 nm of about 2% or less, and shows high contrast and high color reproducibility of an image because fluorescence has been suppressed.

Regarding the use embodiment of the filter of the present invention, for example, the filter may be placed in front of an image display device and used as a front plate, the filter may be pasted on a transparent plate such as a glass plate, resin plate and the like and this may be placed in front of an image display device and used as a front plate, or the filter may be pasted directly on a display of an image display device.

When the filter is pasted on a transparent plate such as a glass plate, resin plate and the like and this is used as a front plate, the thickness of the transparent plate is usually about 1 mm or more, preferably about 2 mm or more from the standpoint of strength, and usually about 10 mm or less, preferably about 6 mm or less from the standpoint lightweight. As the transparent plate, those having a visible light transmittance of about 50% or more are usually used. When the transparent plate is a resin plate, examples of resin materials constituting the resin plate include acrylic resin, polycarbonate resin, triacetylcellulose resin, polystyrene resin, polyester resin, ABS resin and the like. Further, if necessary, the resin plate may contain a stabilizer, ultraviolet absorber, antioxidant, light scattering agent, antistatic agent, flame retardant, releasing agent, near infrared ray absorber, color controlling dye and the like.

When the filter of the present invention is pasted on a transparent plate such as a glass plate, resin plate and the like and this is used as a front plate, and when the filter is pasted on a display of an image display device, the pasting may be effected, for example, by using an adhesive or by a heat press.

Additionally, the filter of the present invention and a front plate obtained by using this may be endowed with various abilities such as electromagnetic wave-shielding property, hard coating property, antireflection property, stain proof property and the like, if necessary.

When an electromagnetic wave-shielding layer is provided, the electromagnetic wave-shielding layer is usually composed of a conductive thin film in the form of lattice such as ITO (indium-tin complex oxide), copper, aluminum and the like, or a transparent conductive thin film such as gold, silver, platinum and the like. Regarding the conductive thin film in the form of lattice, the lattice interval is usually in the range from about 80 μm to about 200 μm, the film thickness is usually from about 1 μm to about 20 μm, preferably from about 5 μm to about 20 μm, the lattice line width is usually from about 5 μm to about 50 μm, preferably from about 10 μm to 30 μm, and the aperture rate is usually about 60% or more, preferably about 70% or more, further preferably about 80% or more. Regarding the transparent conductive thin film, the thickness is usually from about 30 nm to about 1000 nm, preferably from about 50 nm to about 500 nm. The electromagnetic wave-shielding layer is preferably formed by pasting a film having on the surface thereof a conductive thin film in the form of lattice or a transparent conductive thin film, from the stand point of productivity, and as such a film, a transparent film such as a polyethylene terephthalate film and the like is used.

When a hard coat layer is provided, this hard coat layer can be formed usually by applying a hard coat agent containing a polyfunctional monomer, cross-linking silicone resin, cross-linking melamine resin or cross-linking epoxy resin, then, hardening this, and the thickness thereof usually from about 1 μm to about 30 μm. Further, a glare shielding ability may be imparted by allowing a hard coat layer to contain fine particles of inorganic compounds such as silicon dioxide and aluminum oxide, and the like.

When a glare shielding layer is provided, this glare shielding layer is usually made of an inorganic oxides, inorganic halides, fluorine-containing polymers and the like, and the stain proof layer is usually made of fluorine-containing compounds, siloxane compounds and the like.

The filter of the present invention can be used as a filter for image display devices such as direct viewing displays such as CRT, light emitting displays such as a plasma display panel, non-emissive displays such as a liquid crystal display, rear projection mode displays having an integrated projector such as a liquid crystal projector, and the like. Of them, the filter of the present invention is suitably used for a plasma display panel.

EXAMPLES

Examples of the present invention are shown below, but the scope of the present invention is not limited to them. Methods for measuring physical properties are as follows.

(1) Light Transmittance

The light transmittance in the wavelength range from 300 to 1500 nm was measured using a spectrophotometer UV-3100, manufactured by Shimadzu Corp.

(2) Light Reflectance

The light reflectance in the wavelength range from 400 to 700 nm was measured according to SCE mode using a spectral colorimeter CM-2002, manufactured by Minolta Co., Ltd.

(3) Fluorescence Strength

The fluorescence strength in the wavelength range from 550 to 650 nm was measured using a fluorescent spectrophotometer RF-5000 (use of a cell holder for measuring a solid sample), manufactured by Shimadzu Corp.

(4) b*

Color coordinate b* in L*a*b* color specification system was measured according to JIS Z 8729.

The following compounds were used as the component A and the component B.

Compound (A1): Compound of the formula (1) in which $R^1$ and $R^2$ represent an octyl group, and $R^3$ and $R^4$ represent a methyl group, and $L^3$ and $L^4$ represent a benzene ring, is shown in the following formula.

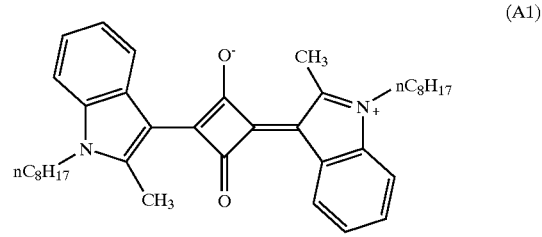

(A1)

This compound (A1) was dissolved in cyclohexanone, and mixed with a toluene solution of methyl polymethacrylate to obtain a solution containing 0.09% by weight of the compound (A1) and 9% by weight of methyl polymethacrylate. This solution was applied on an impact resistant acryl film "TECHNOLLOY®", manufactured by Sumitomo Chemical Co., Ltd., having a thickness of 0.125 mm by using a No. 16 bar coater so that the thickness after drying was about 0.002 mm, then, dried. The light transmittance of the resulted coating film was measured to find the maximum absorption peak of light in the wavelength range from 300 nm to 1500 nm at 585 nm.

Compound (A2): Compound of the formula (2) in which $R^5$ and $R^6$ represent a butyl group, $R^7$ to $R^9$ represent a hydrogen atom, $Z^1$ represents an Isopropylidene group, $Z^2$ represents a sulfur atom, $L^3$ and $L^4$ represent a naphthalene ring, and $X^-$ represents a perchlorate ion, is shown in the following formula.

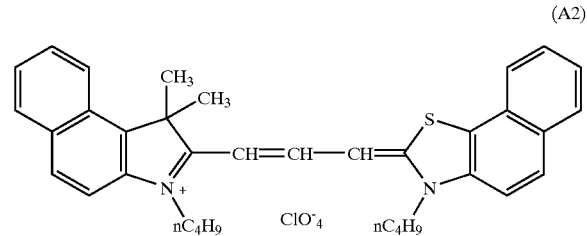

(A2)

This compound (A2) was dissolved in cyclohexanone, and mixed with a toluene solution of methyl polymethacrylate to obtain a solution containing 0.09% by weight of the compound (A2) and 9% by weight of methyl polymethacrylate. This solution was applied on an impact resistant acryl film "TECHNOLLOY®", manufactured by Sumitomo Chemical Co., Ltd., having a thickness of 0.125 mm by using a No. 16 bar coater so that the thickness after drying was about 0.002 mm, then, dried. The light transmittance of the resulted coating film was measured to find the maximum absorption peak of light in the wavelength range from 300 nm to 1500 nm at 589 nm.

Compound (B1): Phthalocyanine-based dye "EXcolor® IR-10", manufactured by Nippon Shokubai Co., Ltd. This compound (B1) was dissolved in toluene, and mixed with a toluene solution of methyl polymethacrylate to obtain a solution containing 0.76% by weight of the compound (B1) and 9% by weight of methyl polymethacrylate. This solution was applied on an impact resistant acryl film "TECHNOLLOY®", manufactured by Sumitomo Chemical Co., Ltd., having a thickness of 0.125 mm by using a No. 16 bar coater so that the thickness after drying was about 0.002 mm, then, dried. The light transmittance of the resulted coating film was measured to find the maximum absorption peak of light in the wavelength range from 300 nm to 1500 nm at 844 nm.

Compound (B2): Phthalocyanine-based dye "EXcolor® IR-12", manufactured by Nippon Shokubai Co., Ltd. This compound (B2) was dissolved in toluene, and mixed with a toluene solution of methyl polymethacrylate to obtain a solution containing 0.22% by weight of the compound (B2) and 9% by weight of methyl polymethacrylate. This solution was applied on an impact resistant acryl film "TECHNOLLOY®", manufactured by Sumitomo Chemical Co., Ltd., having a thickness of 0.125 mm by using a No. 16 bar coater so that the thickness after drying was about 0.002 mm, then, dried. The light transmittance of the resulted coating film was measured to find the maximum absorption peak of light in the wavelength range from 300 nm to 1500 nm at 873 nm.

Compound (B3): Diimmonium dye "IRG-022", manufactured by Nippon Kayaku Co., Ltd. This compound (B3) was dissolved in cyclohexanone, and mixed with a toluene solution of methyl polymethacrylate to obtain a solution containing 1.08% by weight of the compound (B3) and 13% by weight of methyl polymethacrylate. This solution was applied on an impact resistant acryl film "TECHNOLLOY®", manufactured by Sumitomo Chemical Co., Ltd., having a thickness of 0.125 mm by using a No. 16 bar coater so that the thickness after drying was about 0.002 mm, then, dried. The light transmittance of the resulted coating film was measured to find the maximum absorption peak of light in the wavelength range from 300 nm to 1500 nm at 1098 nm.

Reference Example 1 Synthesis of Compound (A1))

3 g of 1-octyl-2-methylindole and 1 g of 3,4-dihydroxy-3-cyclobutene-1,2-dione were dehydrated in a mixed solvent of benzene and butyl alcohol while stirring under heat, then, the reaction mixture was cooled to obtain a crude crystal of the compound (A1). This crude crystal was purified by a silica gel chromatography using chloroform as a developing solution, then, re-crystallized with a mixed solvent of methyl alcohol and acetone, to obtain 1.3 g of a purified product of the compound (A1).

Reference Example 2 Synthesis of Compound (A2)

2.7 g of 3-butyl-2-methylnaphtho[2,1-d]thiazol-3-ium p-toluenesulfonate and 3.0 g of 3-butyl-1,1-dimethyl-2-(2-phenylaminovinyl)-1H-benzo[e]indolium perchlorate were mixed with acetonitrile, into this was added acetic anhydride and triethylamine, they were reacted for 1 hour at room temperature, and the reaction mixture was crystallized with methyl alcohol to obtain a crude crystal of the compound (A2). The crude crystal was washed with hot methyl alcohol, to obtain 3.5 g of a purified product of the compound (A2).

Example 1

100 parts by weight of a toluene solution containing 20% by weight of methyl polymethacrylate was mixed with 40 parts by weight of a cyclohexanone solution containing 0.5% by weight of the compound (A1) and 67.2 parts by weight of a toluene solution containing 2.5% by weight of the compound (B1) and 0.714% by weight of the compound (B2), then, further mixed with toluene, to control the concentration of methyl polymethacrylate to 9% by weight. This solution was applied on an impact resistant acryl film "TECHNOLLOY®", manufactured by Sumitomo Chemical Co., Ltd., having a thickness of 0.125 mm by using a No. 16 bar coater so that the thickness after drying was about 0.002 mm, then, dried. Subsequently, this film was pasted on a glass plate using an adhesive to obtain a filter.

Example 2

The same procedure as in Example 1 was conducted except that the use amount of the cyclohexanone solution containing 0.5% by weight of the compound (A1) was changed to 60 parts by weight, and obtained a filter.

Example 3

The same procedure as in Example 1 was conducted except that 40 parts by weight of the cyclohexanone solution containing 0.5% by weight of the compound (A2) was used instead of 40 parts by weight of the cyclohexanone solution containing 0.5% by weight of the compound (A1), and obtained a filter.

Example 4

The same procedure as in Example 3 was conducted except that the use amount of the cyclohexanone solution containing 0.5% by weight of the compound (A2) was changed to 60 parts by weight, and obtained a filter.

Comparative Example 1

The same procedure as in Example 1 was conducted except that 67.2 parts by weight of the toluene solution containing 2.5% by weight of the compound (B1) and 0.714% by weight of the compound (B2) was not used, and obtained a filter.

Comparative Example 2

The same procedure as in Example 2 was conducted except that 67.2 parts by weight of the toluene solution containing 2.5% by weight of the compound (B1) and 0.714% by weight of the compound (B2) was not used, and obtained a filter.

Comparative Example 3

The same procedure as in Example 3 was conducted except that 67.2 parts by weight of the toluene solution containing 2.5% by weight of the compound (B1) and 0.714% by weight of the compound (B2) was not used, and obtained a filter.

Comparative Example 4

The same procedure as in Example 4 was conducted except that 67.2 parts by weight of the toluene solution containing 2.5% by weight of the compound (B1) and 0.714% by weight of the compound (B2) was not used, and obtained a filter.

Example 5

100 parts by weight of a toluene solution containing 25% by weight of an acrylic resin "SUMIPEX® MM", manufactured by Sumitomo Chemical Co., Ltd., was mixed with a solution containing 0.213 parts by weight of the compound (A1), 2.2 parts by weight of the compound (B1), 0.625 parts by weight of the compound (B2) and 3.25 parts by weight of the compound (B3) dissolved in an organic solvent, further, mixed with toluene to control the concentration of the acrylic resin to 11% by weight. This solution was applied on a polyester film "Cosmoshine® A1513", manufactured by Toyobo Co., Ltd., having a thickness of 0.125 mm by using a No. 16 bar coater so that the thickness after drying was about 0.002 mm, then, dried. Subsequently, this film was pasted on a glass plate using an adhesive to obtain a filter.

Example 6

The same procedure as in Example 5 was conducted except that the 0.25 parts by weight of the compound (A2) was used instead of 0.213 parts by weight of the compound (A1), and obtained a filter.

Example 7

The same procedure as in Example 5 was conducted except that the 2.2 parts by weight of the compound (B1) and 0.625 parts by weight of the compound (B2) were not used, and obtained a filter.

Example 8

To 100 parts by weight of an acrylic adhesive was added 0.16 parts by weight of the compound (A1), 0.672 parts by weight of the compound (B1) and 0.192 parts by weight of the compound (B2), and an impact resistant acryl film "TECHNOLLOY®", manufactured by Sumitomo Chemical Co., Ltd., having a thickness of 0.125 mm was pasted on glass using this adhesive to obtain a filter.

Comparative Example 5

100 parts by weight of methyl methacrylate was mixed with 0.002 parts by weight of 2,2'-azobisisobutyronitrile, and they were pre-polymerized at 70° C., to obtain a pre-polymerized syrup containing 5% by weight of a polymer (viscosity—average molecular weight: 1500000). 30 parts by weight of this pre-polymerized syrup was mixed with 70 parts by weight of methyl methacrylate, 0.0015 parts by weight of the compound (A1), 0.0112 parts by weight of the compound (B1) and 0.1 parts by weight of 2,2'-azobisisobutyronitrile, deaerated, then, the mixture was injected into a cell of 2 mm thickness constituted of two pieces of glass plates and a vinyl chloride resin gasket, and polymerized at 65° C. for 4 hours, then, at 120° C. for 1 hour. After cooling, the cell was disjointed to obtained a filter.

Comparative Example 6

The same procedure as in Comparative Example 5 was conducted except that 0.0010 parts by weight of the compound (A2) was used instead of 0.0015 parts by weight of the compound (A1), and obtained a filter.

Comparative Example 7

The same procedure as in Comparative Example 5 was conducted except that the use amount of the compound (A1) was changed to 0.0010 parts by weight, the use amount of the compound (B1) was changed to 0.0075 part by weight, and the thickness of the cell was changed to 3 mm, and obtained a filter.

Comparative Example 8

The same procedure as in Comparative Example 5 was conducted except that 0.0007 parts by weight of the compound (A2) was used instead of 0.0015 parts by weight of the compound (A), the use amount of the compound (B1) was changed to 0.0075 parts, and the thickness of the cell was changed to 3 mm, and obtained a filter.

Comparative Example 9

The same procedure as in Comparative Example 5 was conducted except that the use amount of the compound (A1) was changed to 0.0010 parts, 0.0075 parts by weight of the compound (B2) was used instead of 0.0112 parts by weight of the compound (B1), and the thickness of the cell was changed to 3 mm, and obtained a filter.

Comparative Example 10

The same procedure as in Comparative Example 5 was conducted except that 0.0007 parts by weight of the compound (A2) was used instead of 0.0015 parts by weight of the compound (A1), 0.0075 parts by weight of the compound (B2) was used instead of 0.0112 parts by weight of the compound (B1), and the thickness of the cell was changed to 3 mm, and obtained a filter.

Regarding the above-mentioned film pasted glass plates (filter) obtained in Examples 1, 3, 5 to 8 and Comparative Examples 1, 3 and the injected resin plates (filter) obtained in Comparative Examples 5 to 10, the fluorescence of the end surface was visually observed, and the problem on practical use was evaluated by ○ (no problem) or X (problematical). The light reflectance was measured, and a difference between the light reflectance at a wavelength of 550 nm and the light reflectance at a wavelength of 620 nm (latter minus former) was calculated. When this difference is smaller, it is judged that fluorescence is suppressed. Further, the fluorescence strength was measured, and the relative strength of fluorescence at the highest fluorescence wavelength. These evaluation results are shown in Table 1.

TABLE 1

| Example | Visual observation | Reflectance (%) | | | Fluorescence | |
|---|---|---|---|---|---|---|
| | | Wave length | | | Wave length (nm) | Intensity |
| | | 550 nm | 620 nm | Difference | | |
| Example 1 | ○ | 0.16 | 0.28 | 0.12 | 599.2 | 3.4 |
| Example 3 | ○ | 0.21 | 0.61 | 0.40 | 599.8 | 7.8 |
| Example 5 | ○ | 0.08 | 0.17 | 0.09 | — | — |
| Example 6 | ○ | 0.05 | 0.05 | 0.00 | — | — |
| Example 7 | ○ | 0.08 | 0.06 | −0.02 | — | — |
| Example 8 | ○ | 0.03 | 0.96 | 0.93 | — | — |
| Comparative example 1 | X | 0.50 | 2.53 | 2.03 | 605.2 | 64.4 |
| Comparative example 3 | X | 0.39 | 7.00 | 6.61 | 604.4 | 247.0 |
| Comparative example 5 | X | 0.11 | 5.66 | 5.55 | 593.6 | 347.6 |
| Comparative example 6 | X | 0.09 | 6.28 | 6.19 | 599.6 | 558.7 |
| Comparative example 7 | X | 0.10 | 4.28 | 4.18 | 593.2 | 222.2 |
| Comparative example 8 | X | 0.10 | 5.81 | 5.71 | 598.8 | 418.3 |
| Comparative example 9 | X | 0.20 | 3.77 | 3.57 | — | — |
| Comparative example 10 | X | 0.12 | 5.35 | 5.23 | — | — |

On the above-mentioned film pasted glass plates (filter) obtained in Examples 2, 4 to 6 and Comparative Examples 2, 4, a humidity heat resistance test (exposure under temperature of 60° C., relative humidity of 90%, 250 hours) and a heat resistance test (exposure under temperature of 80° C., dry state, 250 hours) were effected. The light transmittance was measured before and after each test, and the increase value in light transmittance at 585 nm was calculated, and b* was measured, and the increase value in it was calculated. When these values are small, it is judged that durability is excellent. The results of the humidity heat resistance test are shown in Table 2, and the results of the heat resistance test are shown in Table 3. Further, the light transmittances at a wavelength of 850 nm and 1000 nm are shown in Table 4.

TABLE 2

|  | Light transmittance (%) at 585 nm | | | b* | | |
| --- | --- | --- | --- | --- | --- | --- |
|  | Before test | After test | Increase value | Before test | After test | Increase value |
| Example 2 | 17.37 | 19.69 | 2.32 | −23.81 | −22.72 | 1.09 |
| Example 4 | 25.99 | 28.14 | 2.15 | −27.92 | −26.57 | 1.35 |
| Example 5 | 30.53 | 31.58 | 1.05 | −9.51 | −7.48 | 2.03 |
| Example 6 | 23.91 | 23.72 | −0.19 | −19.19 | −17.03 | 2.16 |
| Comparative example 2 | 18.70 | 22.10 | 3.40 | −25.99 | −24.28 | 1.71 |
| Comparative example 4 | 44.57 | 64.16 | 19.59 | −19.83 | −10.28 | 9.55 |

TABLE 3

|  | Light transmittance (%) at 585 nm | | | b* | | |
| --- | --- | --- | --- | --- | --- | --- |
|  | Before test | After test | Increase value | Before test | After test | Increase value |
| Example 2 | 17.37 | 21.35 | 3.98 | −23.81 | −21.35 | 2.46 |
| Example 4 | 25.99 | 28.41 | 2.42 | −27.92 | −26.45 | 1.47 |
| Example 5 | 30.53 | 32.35 | 1.82 | −9.51 | −7.60 | 1.91 |
| Example 6 | 23.91 | 23.86 | −0.05 | −19.19 | −17.84 | 1.35 |
| Comparative example 2 | 18.70 | 27.54 | 8.84 | −25.99 | −21.01 | 4.98 |
| Comparative example 4 | 44.57 | 59.56 | 14.99 | −19.83 | −12.22 | 7.61 |

TABLE 4

|  | Light transmittance (%) at 850 nm | | | Light transmittance (%) at 1000 nm | | |
| --- | --- | --- | --- | --- | --- | --- |
|  | Before test | After test(*1) | After test(*2) | Before test | After test(*1) | After test(*2) |
| Example 2 | 27.85 | 27.81 | 27.72 | 91.27 | 91.42 | 91.34 |
| Example 4 | 23.35 | 24.35 | 23.56 | 91.84 | 91.79 | 91.58 |
| Example 5 | 5.24 | 5.44 | 5.87 | 3.25 | 4.00 | 4.18 |
| Example 6 | 2.40 | 2.35 | 2.48 | 1.36 | 1.75 | 1.74 |
| Comparative example 2 | 92.39 | 93.24 | 92.64 | 92.68 | 92.80 | 92.74 |
| Comparative example 4 | 92.46 | 92.60 | 92.09 | 92.74 | 92.76 | 92.64 |

Test(*1): Humidity heat resistance test
Test(*2): Heat resistance test

According to the present invention, a filter for image display device having excellent in contrast and color reproducibility of an image and also in durability can be obtained. This filter is suitable particularly as a filter for a plasma display panel.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A filter for an image display device comprising a resin layer having a thickness of about 1 mm or less containing therein (A) at least one compound selected from a compound of the following formula (1)

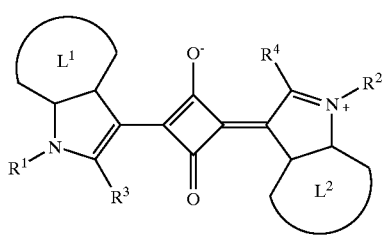

(1)

wherein $R^1$ and $R^2$ each independently represent an aliphatic hydrocarbon group optionally having a substituent, $R^3$ and $R^4$ each independently represent a hydrogen atom or substituent, and $L^1$ and $L^2$ each independently represent an aromatic ring having a substituent; and the following formula (2):

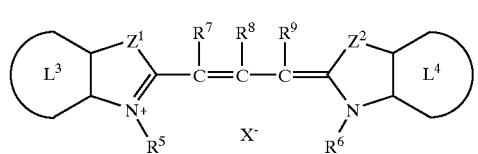

(2)

wherein $R^5$ and $R^6$ each independently represent an aliphatic hydrocarbon group optionally having a substituent, $R^7$ to $R^9$ each independently represent a hydrogen atom or substituent, $Z^1$ and $Z^2$ each independently represent a group for forming a 5-membered ring, $L^3$ and $L^4$ each independently represent an aromatic ring optionally having a substituent, and $X^-$ represents a counter anion; and (B) a compound having an absorption peak of light in the wavelength range from about 780 nm to about 1200 nm.

2. The filter for an image display device according to claim 1, wherein $R^1$ and $R^2$ each independently represent an alkyl group having 1 to 20 carbon atoms or an aralkyl group having 7 to 20 carbon atoms, $R^3$ and $R^4$ each independently represent an alkyl group having 1 to 20 carbon atoms or an aralkyl group having 7 to 20 carbon atoms, $L^1$ and $L^2$ each independently represent a benzene ring optionally having an alkyl group having 1 to 20 carbon atoms, an aryl group having 6 to 20 carbon atoms, an aralkyl group having 7 to 20 carbon atoms or a halogen atom.

3. The filter for an image display device according to claim 1, wherein $R^5$ and $R^6$ each independently represent an alkyl group having 1 to 20 carbon atoms or an aralkyl group having 7 to 20 carbon atoms, $R^7$, $R^8$ and $R^9$ each independently represent an alkyl group having 1 to 20 carbon atoms or an aralkyl group having 7 to 20 carbon atoms, $Z^1$ and $Z^2$ each independently represent an alkylidene group having 1 to 20 carbon atoms, alkylimino group having 1 to 20 carbon atoms, oxygen atom, sulfur atom, selenium atom or tellurium atom, $L^3$ and $L^4$ each independently represent preferably a benzene ring or naphthalene ring optionally having an alkyl group having 1 to 20 carbon atoms, an aryl group having 6 to 20 carbon atoms, an aralkyl group having 7 to 20 carbon atoms or a halogen atom, $X^-$ represents a halide ion, perhalogenate ion, fluoro complex ion or sulfonate ion.

4. The filter for an image display device according to claim 1, wherein the compound of the formulae (1) or (2) has an absorption peak of light in the wavelength range from about 550 nm to about 610 nm.

5. The filter for an image display device according to claim 1, wherein (B) the compound having an absorption peak of light in the wavelength range from about 780 nm to about 1200 nm is at least one compound selected from phthalocyanine compound, dioxazine compound, benzofuran compound, thiophenemonoazo compound, anthraquinone compound, cyanine compound, diimmonium compound and aminium compound.

6. The filter for an image display device according to claim 1, wherein (B) the compound having an absorption peak of light in the wavelength range from about 780 nm to about 1200 nm is composed of a compound having an absorption peak of light in the wavelength range from about 780 nm to about 1000 nm and a compound having an absorption peak of light in the wavelength range from about 1000 nm to about 1200 nm.

7. The filter for an image display device according to claim 1, wherein a content of (A) at least one compound selected from the compound of the formulae (1) and (2) is from about 0.01 to about 10 parts by weight based on 100 parts by weight of th resin, and the content of (B) the compound having an absorption peak of light in the wavelength range from about 780 nm to about 1200 nm is from about 0.05 to about 60 parts by weight based on 100 parts by weight of the resin.

8. The filter for an image display device according to claim 1, wherein a light transmittance at a wavelength of 585 nm is about 60% or less, and a light transmittance in a wavelength range from 780 nm to 1200 nm is about 20% or less.

9. The filter for an image display device according to claim 1, wherein the image display device is a plasma display panel.

* * * * *